Patented July 6, 1948

2,444,546

UNITED STATES PATENT OFFICE 2,444,546

VULCANIZATION OF CHLOROPRENE ELASTOMERS IN THE PRESENCE OF DINITROSOBENZENE AND CATECHOL

Robert Henry Walsh, Woodstown, N. J., assignor to E. I. du Pont de Nemours & Company, Wilmington, Del., a corporation of Delaware No Drawing. Application April 24, 1945, Serial No. 590,117

4 Claims. (Cl. 260—92.7)

This invention relates to the vulcanization of elastomers comprising 2 - chlorobutadiene-1,3 polymers, and more particularly to an improvement in the preparation of froth sponge from latices of 2-chlorobutadiene-1,3 (which will hereinafter be referred to as chloroprene) polymers, or copolymers of the same with copolymerizable unsaturated compounds containing the vinylidene radical

In the manufacture of froth sponge from the polychloroprene latices, difficulty has been experienced in obtaining products having high load carrying capacity and low compression set where the vulcanization or curing is carried out at low temperatures, namely, of from 100° to 120° C. Although vulcanization of polychloroprene elastomers with metal oxides is suitable for many uses, it has been found to be inadequate in the production of froth sponge articles where a very fast rate of cure at low temperatures is desired.

It is therefore an object of this invention to provide an improved process for vulcanizing or curing froth sponge produced from latices of chloroprene polymers either alone or when copolymerized with unsaturated compounds which carry the vinylidene radical, including other butadiene compounds, whereby the speed of vulcanization is materially increased and, when desired, lower temperatures may be employed to effect the vulcanization. A still further object of the invention is to provide a process for vulcanizing polychloroprene froth sponge whereby higher load carrying capacity, lower compression set and superior freeze resistance are obtained.

I have found that the vulcanization of froth sponge produced from 2-chlorobutadiene-1,3 polymers and copolymers of the same with unsaturated compounds as above mentioned, with which are incorporated the usual metal oxides, antioxidants and petrolatum, can be carried out at lower temperatures or in a much shorter time at high temperatures when there is incorporated in the latex a small amount of meta- or para-dinitrosobenzene together with a small amount of catechol, with or without the addition of rubber vulcanization accelerators such as the salts of dialkyl-dithiocarbamic acids.

In the curing and vulcanizing of froth sponge made from polychloroprene, it has been found that the use of zinc oxide or lead oxide is necessary to obtain vulcanizates having the desired physical properties. The activity of these oxides is materially enhanced by the addition of a dinitrosobenzene together with a small amount of catechol.

The following examples are given to illustrate the invention. Unless otherwise specified, the parts used are by weight.

EXAMPLE 1

To illustrate the effectiveness of the catechol with the nitrosobenzene when used in the vulcanization of froth sponge, the chloroprene latex was compounded according to the following formulae:

Table I

| | A | B | C | D | E | F |
|---|---|---|---|---|---|---|
| 2-Chlorobutadiene-1,3 Polymer (as 60% latex) | 100 | 100 | 100 | 100 | 100 | 100 |
| Zinc Oxide | 5 | 5 | 5 | 5 | 5 | 5 |
| Phenyl-beta-Naphthylamine | 2 | 2 | 2 | 2 | 2 | 2 |
| Petrolatum | 5 | 5 | 5 | 5 | 5 | 5 |
| Sodium Dibutyldithiocarbamate | | | | | 0.8 | 0.8 |
| Catechol | | | 1 | 1 | 1 | 1 |
| p-Dinitrosobenzene | | 0.5 | | 0.5 | | 0.25 |

The latex in each case was frothed in a Hobart mixer until the foam had reached approximately its maximum frothing height. Where indicated, the sodium dibutyldithiocarbamate was added as a 25% aqueous solution. The water insoluble ingredients, namely, zinc oxide, petrolatum, phenyl-beta-naphthylamine and p-dinitrosobenzene, were each added as 50% aqueous dispersions, followed by a 20% aqueous solution of the catechol, where indicated. Four parts of sodium fluosilicate, prepared as a 20% ball-milled dispersion, were then incorporated. Whipping was continued until the sodium fluosilicate was evenly distributed throughout the foam. The froth was then poured into a lubricated mold and allowed to gel. The sponges were cured for 60 minutes at 100° C. The state of cure was determined by a modified ASTM compression-deflection test. (ASTM Standards for Rubber Products, 1943 edition, page 253.) This test measures the dead weight load required to produce a 25% deflection of a cylindrical test specimen 1.129 inches in diameter, the higher numbers representing the higher state of cure. The results on froth sponges prepared from the above compounds are given in Table II.

Table II

| Stock: | Compression-Deflection, p. s. i. |
|---|---|
| A | No cure |
| B | 1.2 |
| C | No cure |
| D | 2.1 |
| E | 2.2 |
| F | 3.4 |

These data indicate that the presence of catechol with p-dinitrosobenzene gives considerable improvement in cure when used at 100° C. when compared with any of the standard latex formulae for producing froth sponge which are designed for curing at higher temperatures.

The improvement in state of cure produced by catechol with p-dinitrosobenzene is more clearly demonstrated in Table III, in which results of compression set tests are given. These tests were run according to the standard ASTM method (ASTM Standards for Rubber Products, 1943 edition, page 254), and measure the percentage compression set on a test sample after holding the sample under 50% deflection for 22 hours at 70° C., then cooling for 30 minutes at room temperature. These sponges were vulcanized for 60 minutes at 100° C. In this test, the lower numbers represent the higher state of cure.

Table III

| Stock: | Compression set, percent |
|---|---|
| D | 4.8 |
| E | 8.6 |
| F | 2.5 |

These data show that the catechol-p-dinitrosobenzene combination (D) produces a much better cure than the catechol-sodium dibutyldithiocarbamate combination (E). Compound F, which contains p-dinitrosobenzene added to the formulation of compound E, is even better.

As illustrated in the following table, the freeze resistance of froth sponge produced with catechol and p-dinitrosobenzene is markedly improved over that of the froth sponge produced without the presence of the catechol. While it is known that the addition of sulfur in the preparation of froth sponge improves its freeze resistance, the addition of the catechol together with the p-dinitrosobenzene has been found to impart to the sulfur containing products greater freeze resistance. The following table gives the comparative freeze resistance of such stocks, in the form of cured sponge.

The stocks tested were prepared as illustrated above, each stock containing the following ingredients:

Table IV

|  | F | G | H | I | J |
|---|---|---|---|---|---|
| 2-Chlorobutadiene-1,3 Polymer (as 60% latex) | 100 | 100 | 100 | 100 | 100 |
| Zinc Oxide | 5 | 5 | 5 | 5 | 5 |
| Phenyl-beta-Naphthylamine | 2 | 2 | 2 | 2 | 2 |
| Sulfur |  |  |  | 2 | 2 |
| Petrolatum | 5 | 5 | 5 | 5 | 5 |
| Sodium Dibutyldithiocarbamate | 0.8 | 0.8 | 0.8 | 0.8 | 0.8 |
| p-Dinitrosobenzene | 0.25 | 0.25 |  | 0.50 |  |
| Catechol | 1 |  |  |  | 1 |

The froth sponges prepared from the compounds listed in Table IV were cured for 60 minutes at 140° C. The freeze resistance of these products is shown in the following table:

Table V

| Hours | Per Cent Deflection | | | | |
|---|---|---|---|---|---|
|  | F | G | H | I | J |
| Aging Period at 0° C.: |  |  |  |  |  |
| 0 | 25.0 | 25.0 | 25.0 | 25.0 | 25.0 |
| 5 | 17.5 | 13.5 | 9.0 | 19.5 | 11.0 |
| 24 | 9.5 | 6.5 | 3.5 | 19.0 | 5.5 |
| 72 | 5.5 | 2.5 | 0.6 | 16.5 | 1.0 |
| 96 | 4.5 | 2.0 | 0.0 | 12.5 | 0.3 |
| Aging Period at −18° C.: |  |  |  |  |  |
| 0 | 25.0 | 25.0 | 25.0 | 25.0 | 25.0 |
| 5 | 11.5 | 10.0 | 6.0 | 13.5 | 9.0 |
| 24 | 7.0 | 6.0 | 2.5 | 12.5 | 4.5 |
| 72 | 2.5 | 1.5 | 0.0 | 6.5 | 0.3 |
| 96 | 2.0 | 0.8 | 0.0 | 5.5 | 0.0 |
| Aging Period at −40° C.: |  |  |  |  |  |
| 0 | 25.0 | 25.0 | 25.0 | 25.0 | 25.0 |
| 1 | 5.5 | 3.5 | 0.8 | 10.0 | 1.5 |
| 2 | 1.5 | 0.8 | 0.0 | 5.5 | 0.3 |
| 5 | 0.0 | 0.0 | 0.0 | 1.5 | 0.0 |

The freeze resistance of each of the samples given in the above table was determined as follows: The weight necessary to compress a cylindrical sample 1.129 inches in diameter exactly 25% of its height, was determined at 28° C. The samples were then conditioned in a cold chamber at the specified temperatures and for the specified times. The freeze resistance of the sponge was then determined by noting the height of the sample immediately after applying the same load that gave 25% deflection at 28° C. The deflection was calculated as follows:

$$\% \text{ Deflection} = \frac{h_0 - h_1}{h_0}$$

where $h_0$ = height of sample at 28° C.
$h_1$ = height of sample at test temperature under load necessary to give 25% deflection at 28° C.

A decrease in the deflection value from the 25% at 28° C. indicates stiffening or freezing of the sponge.

The latex compound will of course contain from 1% to 10% of the usual antioxidant such as phenyl-alpha-naphthylamine and phenyl-beta-naphthylamine, and from 2% to 10% of petrolatum, based on the weight of the elastomer. The dinitrosobenzene, catechol and salt of the dialkyl-dithiocarbamate may be incorporated with the chloroprene latex by mixing operation either before or during the frothing operation.

Where meta-dinitrosobenzene is employed in place of p-dinitrosobenzene, similar results are obtained.

The amount of the dinitrosobenzene compound which may be used can be varied over a wide range, and will depend upon the nature of the polymer and the particular properties desired in the resulting vulcanizate. In general, the preferred range will be from 0.1% to 4% of the dinitrosobenzene, based on the weight of the elastomer.

The amount of catechol to be employed in the production of froth sponge should be from 0.1% to 3%, based on the weight of the elastomer.

While in the above examples the invention has been illustrated by the use of polychloroprene alone, the invention is also applicable in the vulcanization of the chloroprene copolymers such as those in which the chloroprene is copolymerized with unsaturated compounds which carry the vinylidene grouping

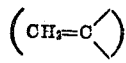

which are capable of forming long chain polymers. Examples of the type of unsaturated compounds which may be used in the modification of the chloroprene are styrene, vinyl methyl ketone, acrylic and alpha substituted acrylic acids and their derivatives such as acrylic nitrile, methyl methacrylate, and methyl chloracrylate, vinylidene chloride, butadiene, isoprene, etc. The copolymers particularly comprehended within the scope of the present invention are those containing 50% or more of the chloroprene. These polymers and copolymers all exhibit elastic, rubber-like properties and are therefore referred to in this description as elastomers, in accordance with the suggestion made by Fisher in Ind. & Eng. Chem., August 1939, pages 941–945.

As illustrated in the above examples, the action of the dinitrosobenzenes and catechol is increased by the presence of several other classes of compounds. Thus, metallic oxides, particularly those of zinc and lead, have an important effect. The use of zinc oxide is preferred in all types of vulcanization with the dinitrosobenzenes. The amounts of such oxides ordinarily employed may vary from 1% to 25%.

The action of the catechol and dinitrosobenzene is further increased by vulcanization accelerators such as the salts of dialkyl-dithiocarbamic acids. Besides the sodium salt of dibutyl-dithiocarbamate, other salts of alkyl carbamates may be employed such as the zinc salt of dibutyl-dithiocarbamate and the zinc salt of diethyl-dithiocarbamate. Suitable amounts of these agents are from 0.1 to 5%, based on the weight of the elastomer.

The present invention is of course applicable to the vulcanization of froth sponge containing the usual fillers, extenders, softeners, pigments and other compounding ingredients, including sulfur, which, as illustrated above, improves the freeze resistance of the product.

This invention provides a method for vulcanizing froth sponge of chloroprene polymers, including copolymers, more rapidly than has heretofore been possible, producing vulcanizates which show improved physical properties. It is of particular importance since it permits curing (vulcanizing) at lower temperatures than has heretofore been possible.

I claim:

1. The improvement in the process of vulcanizing froth sponge prepared from an elastomer of the class consisting of polychloroprene and copolymers of chloroprene with copolymerizable unsaturated compounds containing the vinylidene radical which contain at least 50% polychloroprene, which comprises incorporating into the froth prior to vulcanization from 1% to 25%, based on the weight of the elastomer, of an oxide of the class consisting of zinc oxide and lead oxide, from 0.1% to 3% of catechol and from 0.1% to 4% of a dinitrosobenzene of the class consisting of meta- and para-dinitrosobenzene, based on the weight of the elastomer, and subjecting the froth to vulcanizing conditions.

2. The improvement in the process of vulcanizing froth sponge prepared from an elastomer of the class consisting of polychloroprene and copolymers of chloroprene with copolymerizable unsaturated compounds containing the vinylidine radical which contain at least 50% polychloroprene, which comprises incorporating into the froth prior to vulcanization from 1% to 25%, based on the weight of the elastomer, of an oxide of the class consisting of zinc oxide and lead oxide, from 0.1% to 3% of catechol, from 0.1% to 4% of a dinitrosobenzene of the class consisting of meta- and para-dinitrosobenzene and from 0.1% to 5% of the sodium salt of dibutyl-dithiocarbamic acid, based on the weight of the elastomer, and subjecting the froth to vulcanizing conditions.

3. A vulcanized froth sponge obtained by the process of claim 1.

4. A vulcanized froth sponge obtained by the process of claim 2.

ROBERT HENRY WALSH.